(12) United States Patent
Nishide et al.

(10) Patent No.: US 9,056,385 B2
(45) Date of Patent: Jun. 16, 2015

(54) GRINDING MACHINE AND METHOD WITH IMPROVED TEACHING OPERATION

(75) Inventors: Takashi Nishide, Fujisawa (JP); Susumu Nakano, Ohtsu (JP); Yoshiaki Ishikawa, Ohtsu (JP); Tubasa Sakamoto, Ohtsu (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 14/131,756

(22) PCT Filed: Jun. 22, 2012

(86) PCT No.: PCT/JP2012/066079
§ 371 (c)(1),
(2), (4) Date: Jan. 9, 2014

(87) PCT Pub. No.: WO2013/008612
PCT Pub. Date: Jan. 17, 2013

(65) Prior Publication Data
US 2014/0148081 A1    May 29, 2014

(30) Foreign Application Priority Data

Jul. 11, 2011 (JP) ................................. 2011-153217

(51) Int. Cl.
*B24B 5/37* (2006.01)
*B24B 51/00* (2006.01)
(Continued)

(52) U.S. Cl.
CPC ................. *B24B 51/00* (2013.01); *B24B 49/03* (2013.01); *B24B 5/37* (2013.01); *B24B 5/40* (2013.01); *B24B 49/05* (2013.01); *B24B 19/06* (2013.01);
(Continued)

(58) Field of Classification Search
CPC ............ B24B 5/37; B24B 5/40; B24B 49/02; B24B 49/03; B24B 49/04; B24B 49/05; B24B 51/00; B24B 19/06; B23Q 15/04
USPC .......... 451/5, 8, 9, 10, 11, 49, 51, 57, 58, 178
See application file for complete search history.

(56) References Cited

U.S. PATENT DOCUMENTS 5,679,053 A * 10/1997 Sakakura et al. .................. 451/5
5,766,059 A *  6/1998 Imai et al. ........................ 451/49
(Continued)

FOREIGN PATENT DOCUMENTS

JP       3-29257  U     3/1991
JP       4-300160 A    10/1992
(Continued)

OTHER PUBLICATIONS

International Search Report (PCT/ISA/210), dated Jul. 31, 2012, issued by the International Searching Authority in counterpart International Patent Application No. PCT/JP2012/066079.
Written Opinion (PCT/ISA/237), dated Jul. 31, 2012, issued by the International Searching Authority in counterpart International Patent Application No. PCT/JP2012/066079.

*Primary Examiner* — Timothy V Eley
(74) *Attorney, Agent, or Firm* — Sughrue Mion, PLLC (57) ABSTRACT

Teaching (contacting) operation is performed, and from the contact position (SX), the workpiece (2) is ground by a given "test grinding amount (A)." Subsequently, the diameter of the workpiece is measured. Based on the result of the measurement, the residual amount to be ground (residual grinding amount) to obtain the finished dimensions is calculated, and grinding by the "residual grinding amount (R)" is performed.

8 Claims, 7 Drawing Sheets

(51) Int. Cl.
  *B24B 49/03* (2006.01)
  *B24B 49/05* (2006.01)
  *B24B 19/06* (2006.01)
  *B24B 49/02* (2006.01)
  *B23Q 15/04* (2006.01)
  *G05B 19/404* (2006.01)
  *B24B 5/40* (2006.01)

(52) U.S. Cl.
  CPC ............... *B24B 49/02* (2013.01); *B23Q 15/04* (2013.01); *G05B 2219/49319* (2013.01); *G05B 2219/34389* (2013.01); *G05B 19/404* (2013.01); *G05B 2219/36196* (2013.01)

(56) References Cited

U.S. PATENT DOCUMENTS

| | | | |
|---|---|---|---|
| 5,773,731 A * | 6/1998 | Sakakura et al. | 73/865.8 |
| 6,411,861 B1 * | 6/2002 | Clewes et al. | 700/164 |
| 2013/0137341 A1 * | 5/2013 | Sakai et al. | 451/5 |
| 2014/0127972 A1 * | 5/2014 | Nishide | 451/5 |

FOREIGN PATENT DOCUMENTS

| | | |
|---|---|---|
| JP | 2003-94303 A | 4/2003 |
| JP | 2008-84130 A | 4/2008 |
| JP | 2010-76005 A | 4/2010 |
| JP | 2011-45940 A | 3/2011 |

* cited by examiner

FIRST PRODUCT GRINDING CYCLE AFTER SWITCHING OF SETTINGS

ST : TEST FEED COMPLETION POSITION

S1' : HIGH-SPEED FEED COMPLETION POSITION

S3 : FINISH TRANSFER COMPLETION POSITION

S1 : HIGH-SPEED FEED COMPLETION POSITION

CORRECTION FEEDING AMOUNT $H = 0 - (S3' - ST - R)$

R : RESIDUAL GRINDING AMOUNT

GRINDING MACHINE AND METHOD WITH IMPROVED TEACHING OPERATION

TECHNICAL FIELD

The present invention relates to a grinding technique.

BACKGROUND ART

Conventionally, in a process of manufacturing various kinds of workpiece, such as a bearing ring (inner ring, outer ring), grinding on an inner diameter portion of a workpiece (e.g., inner ring) or grinding on a raceway groove of another workpiece (e.g., outer ring) is performed. Various proposals have been made in connection with such a grinding technique (see, e.g., Patent Document 1).

For example, at the time of switching workpiece settings, setting of a positional relationship between a grinding wheel and a workpiece (inner ring, outer ring) may be performed. In this instance, according to a conventional grinding technique, the workpiece is set on a spindle, and then a teaching operation is performed in which an infeed shaft is manually operated to bring the grinding wheel provided on the infeed shaft into contact with the workpiece. For example, the teaching operation with respect to the inner ring includes a manual operation of the infeed shaft to a position where the grinding wheel abuts (contacts) a radially inner surface of the inner ring. Further, the teaching operation with respect to the outer ring includes a manual operation of the infeed shaft to a position where the grinding wheel abuts (contacts) the raceway groove of the outer ring.

PRIOR ART DOCUMENT

Patent Document

Patent Document 1: JP 2010-076005 A

SUMMARY OF INVENTION

Problem to be Solved by Invention

However, the above-described teaching operation (contacting operation) requires an experience, and workers engaging in the teaching operation are required to have high skill. Depending on an experience level of the worker, the teaching operation may take time, and the time required to switch the workpiece settings may be prolonged. As a result, it may hamper an improvement in efficiency of grinding of the workpiece.

In particular, in the case of not using an in-process gauge (a dimension measuring device capable of constantly detecting a grinding condition of a workpiece by setting a pair of sensing pins at a portion to be ground of the workpiece), there is a variation in dimensional accuracy of the portion to be ground, depending on the amount (strength) of contact. Therefore, a defective product is likely to be produced, and as a result, it is very difficult to provide a good product from the first grinding (first product), that is, to grind a good product having a target dimension on the first attempt.

Further, when the machine starts up (e.g., starting up every morning or at the beginning of the week, or starting up after the machine stops for a long time), dimensions of a machine configuration may change due to a temperature difference (e.g., atmospheric temperature or water temperature). A defective product may be produced from the first grinding (first product) depending on an amount (level) of this dimension change. In particular, the defective products are remarkably produced from the machine which does not employ the in-process gauge.

The present invention has been made in view of the above-described problem, and it is an object of the present invention to provide a grinding technique capable of shortening a time required to switch workpiece settings or start up a machine and also capable of reducing occurrence of defective products and grinding a good product having a target dimension from the first grinding.

Means for Solving the Problem

In order to achieve the above object, according to an aspect of the present invention, a grinding machine includes a grinding wheel configured to grind a workpiece, and a grinding wheel control system configured to move the grinding wheel relative to the workpiece to grind the workpiece to have a predetermined finish dimension. The grinding machine includes a first control section configured to preset a contact position at which the grinding wheel contacts a first workpiece, a second control section configured to position, based on the contact position that has been preset, the grinding wheel at a first product grinding start position located back away from the contact position, a third control section configured to move the grinding wheel from the first product grinding start position to grind the first workpiece by a predetermined amount from the contact position so as to obtain a dimension larger than a finish dimension if an outer surface of the workpiece is ground or to obtain a dimension smaller than the finish dimension if an inner surface of the workpiece is ground, and thereafter to feed the grinding wheel back to the first product grinding start position, a fourth control section configured to measure a diameter of the first workpiece that has been ground, and to calculate a residual amount to be ground to obtain the finish dimension, based on a result of the measurement, and a fifth control section configured to position the grinding wheel at a position shifted forward by a correction amount, the position being a normal grinding start position in grinding a second and subsequent workpieces, and to move the grinding wheel from the normal grinding start position to grind the workpiece to a finish feed completion position.

According to an aspect of the invention, the first control section is configured to set a position at which the grinding wheel contacts the workpiece as the contact position, using the same workpiece as the first workpiece.

According to an aspect of the invention, the first control section is configured to set the contact position based on a difference between a diameter of the grinding wheel and the diameter of the first workpiece.

According to an aspect of the invention, a sixth control section is further provided to position, when starting up the grinding machine, the grinding wheel at a position retreated by a predetermined retreat amount from the normal grinding start position if a dimension of a configuration of the grinding machine has been changed.

Advantages of Invention

According to the present invention, the time required for the switching of the workpiece settings and the start-up can be shortened. Further, in the case of not employing an in-process gauge, the grinding technique capable of grinding a good product having a target dimension from the first grinding and thus decreasing production of the defective product can be achieved.

EMBODIMENTS OF INVENTION

Hereinafter, a grinding technique according to an embodiment of the present invention will be described with reference to the accompanying drawings.

Figure 1:
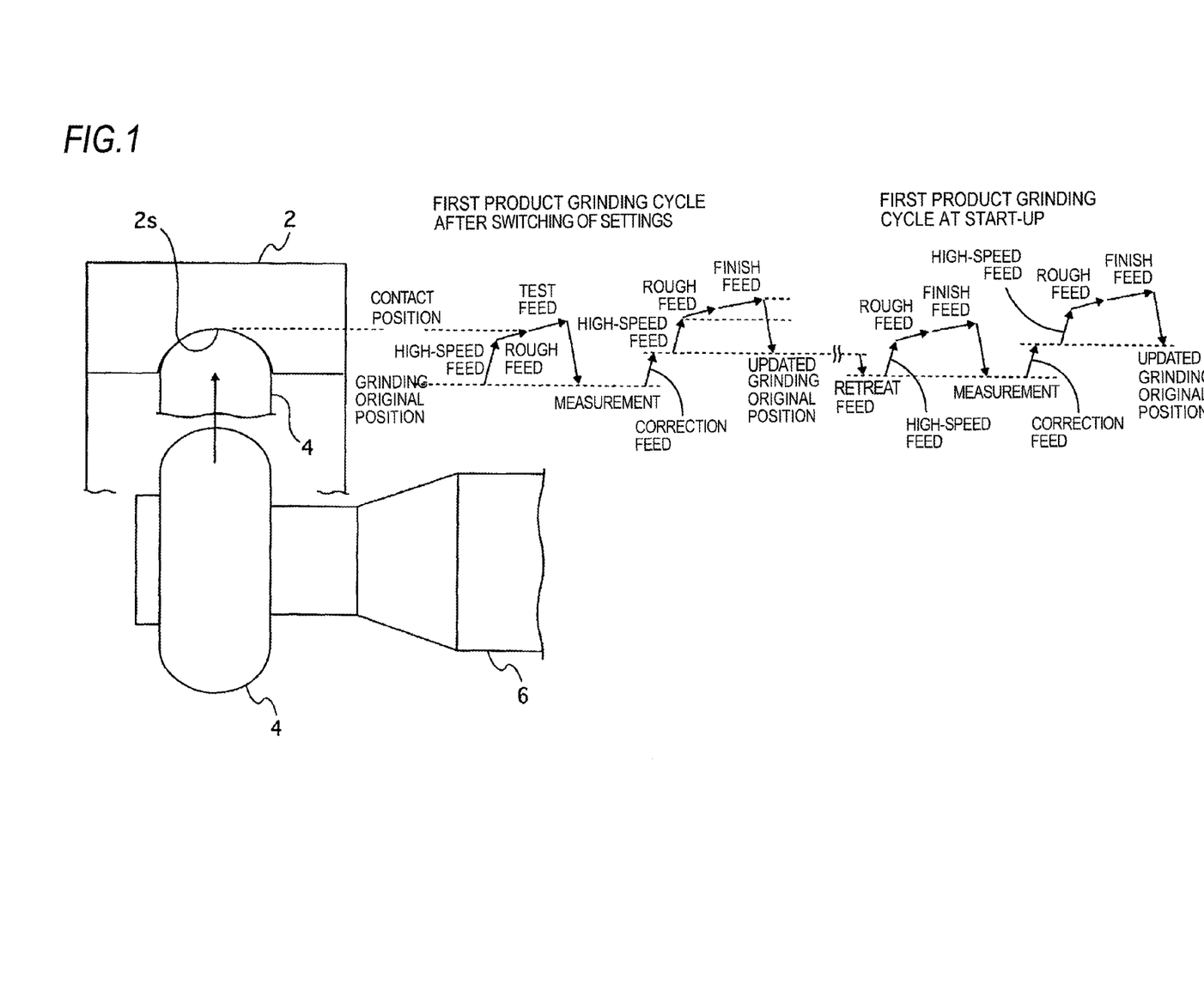
FIG. 1 is a diagram illustrating a specification of a grinding technique according to an embodiment of the present invention.
Figure 3:
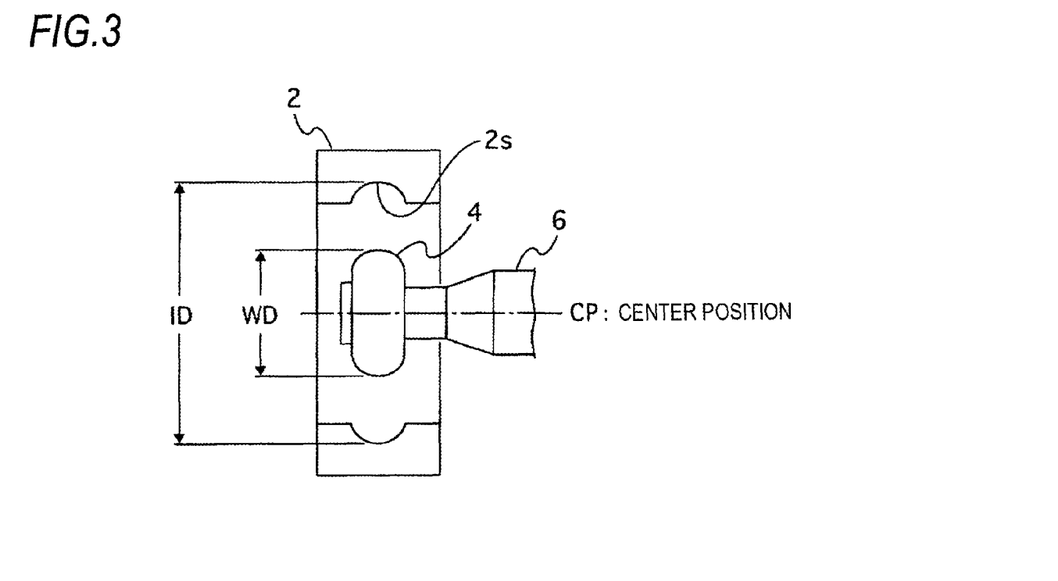
FIG. 3 is a diagram for explaining a process of calculating a contact position from a workpiece diameter and a grinding wheel diameter.
Figure 5A:
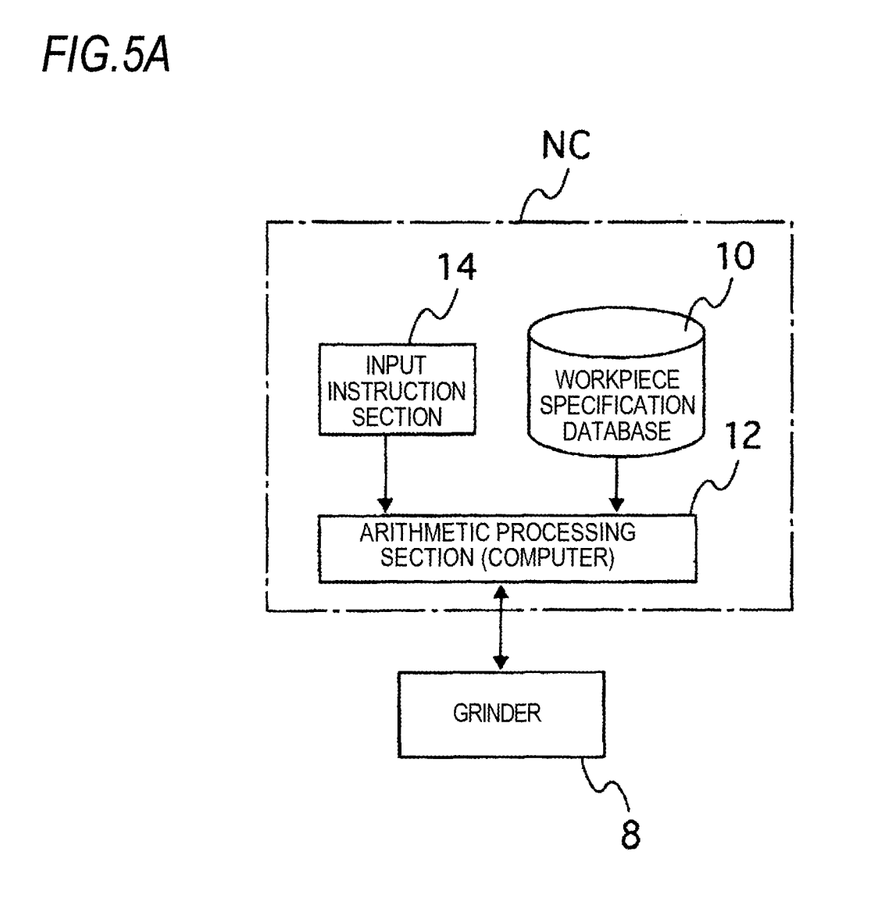
FIG. 5A is a block diagram illustrating the configuration of a grinding wheel control system.

FIGS. 1, 3 and 5A illustrate a configuration of a grinding machine for implementing a grinding technique of this embodiment. The grinding machine includes a grinding wheel 4 configured to grind a workpiece 2, and a grinding wheel control system NC configured to move the grinding wheel 4 relative to the workpiece 2. In this instance, the grinding wheel 4 is supported by a support shaft (also called as an infeed shaft or a servo shaft) of a quill type, and the support shaft 6 is incorporated in the grinder 8 controlled by the grinding wheel control system NC.

The grinding wheel control system NC includes a workpiece specification database 10 in which specifications required for the grinding of various workpieces 2 are registered in advance, and an arithmetic processing section 12 configured to execute a given arithmetic processing based on the specifications of the various workpieces registered in the workpiece specification database 10. Examples of the workpiece 2 include an inner ring and an outer ring of a bearing.

The specifications of various workpieces 2 registered in the workpiece specification database 10 is information required for the grinding of the workpiece 2. For example, the information including a diameter (inner diameter) ID of the workpiece 2 before the grinding, and a moving position of the grinding wheel 4 for the grinding (e.g., a grinding feed position such as high-speed feed completion positions S1, S1', a finish feed completion position S3, and a test feed completion position ST) is used as an example of these specifications.

A computer (not illustrated) for executing various arithmetic processing required for the grinding based on the above-described specifications is installed in the arithmetic processing section 12. The computer includes a ROM (not illustrated) storing various arithmetic processing programs, a RAM (not illustrated) specifying an operational region for executing the arithmetic processing program, and a CPU (not illustrated) executing the arithmetic processing program in the RAM.

In the arithmetic processing section 12, the above-described arithmetic processing is executed based on the specifications of various workpieces registered in the workpiece specification database 10, and the grinder 8 is controlled (e.g., feed control or rotation control) based on the arithmetic processing results. Accordingly, the grinding wheel 4 supported by the support shaft 6 can be moved relative to the workpiece 2 to perform the grinding on the workpiece 2. In this instance, the support shaft 6 is feed-controlled or rotation-controlled by, for example, an AC servo motor (not illustrated). Therefore, the grinding wheel 4 is controlled to move to the above-described grinding feed positions S0, S0', S1, S1', S3, S3'.

Specifically, based on the specification data associated with the workpiece 2 matched to a model number assigned for each workpiece 2, the arithmetic processing section 12 controls the grinder 8. The model number is input from an input instruction section 14 provided in the grinding wheel control system NC. In this instance, the arithmetic processing section 12 detects a rotational displacement and a revolving speed of an output shaft of the AC servo motor by an encoder (rotation detector) (not illustrated), and compares a current position (coordinates) signal and a target position (coordinates) signal to perform a feedback control (feed control and rotation control) on the support shaft 6.

If there is a difference between the current position (coordinates) signal and the target position (coordinates) signal, the arithmetic processing section 12 moves (rotate) the AC servo motor in a direction to decrease the difference from the target position (coordinates) signal. The above procedure is repeated until it reaches finally a target value, or it belongs to an allowable range, thereby performing the movement control of the grinding wheel 4 to the above-described grinding feed positions S0, S1, S2, S3, S4.

Alternatively, for example, the current position information (coordinates) of the AC servo motor can be recorded digitally. The movement of the grinding wheel 4 to the grinding feed positions S0, S1, S2, S3, S4 may be controlled so that the grinding wheel 4 reaches the target value at one time by providing the information with the difference to the target position (coordinates) signal. In this way, it is possible to improve the efficiency of the routine from the switching of the settings of the workpiece 2 to the grinding.

Here, the principle of the grinding technique according to this embodiment will be described.

As illustrated in FIG. 1, the grinding technique of this embodiment is configured to shorten the time required for the switching of the workpiece settings and the start-up. As for the switching the workpiece settings, the present invention provides a "first product grinding cycle after switching of settings", which does not require a work skill, when a setting for grinding a certain workpiece 2 is changed to a setting for grinding another workpiece 2 of a different "model number". Further, in the case where the dimension of the machine configuration is varied due to a temperature difference (e.g., atmospheric temperature or water temperature) at the time of start-up after the grinding machine has been stopped for a long time, the present invention provides a "first product grinding cycle at start-up" which is not influenced by the variation in dimension.

In the "first product grinding cycle after the switching of the settings", the teaching operation (contacting operation) is performed, and after the workpiece 2 is ground from the contact position by a test grinding amount, a diameter (inner diameter) of the unloaded workpiece 2 is measured. Based on the results of the measurement, a residual amount to be ground (residual grinding amount) is calculated. Then, the grinding is performed by the "residual grinding amount". Accordingly, since the skill of the contacting operation is not necessary, the shortening of the time required for the switching of the setting can be improved. In addition, in the case of not using the in-process gauge, the production of the defective product can be eliminated, and thus the good product having a target dimension can be formed from the first grinding.

In the "first product grinding cycle at start-up", the grinding wheel 4 is positioned at a position retreated from the grinding start position (grinding original position) in the previous (the last) grinding by a predetermined "retreat amount". By performing the grinding according to the same process as the normal grinding cycle from this position, the diameter (inner diameter) of the unloaded workpiece 2 is measured. Based on the results of the measurement, a residual amount to be ground (residual grinding amount) is calculated. Then, the grinding is performed by the "residual grinding amount". Therefore, it is possible to shorten the time required for the start-up, and even in the case where the in-process gauge is not used, it is possible to decrease the production of a defective product and to grind a good product having a target dimension from the first grinding.

Subsequently, in the grinding technique according to this embodiment, the operational flow based on the detailed configuration to implement the above-described principle will be described. In this operation flow, the outer ring is used as the workpiece 2. Further, the portion which is subjected to the grinding is, for example, the radially inner surface or the radially outer surface of the outer ring, but here, the radially inner surface of the workpiece (outer ring) 2, that is, the track groove 2s of the outer face, is ground as an example. In this operational flow, the "first product grinding cycle after switching of settings" will be assumed and described as an example.

Figure 5B:
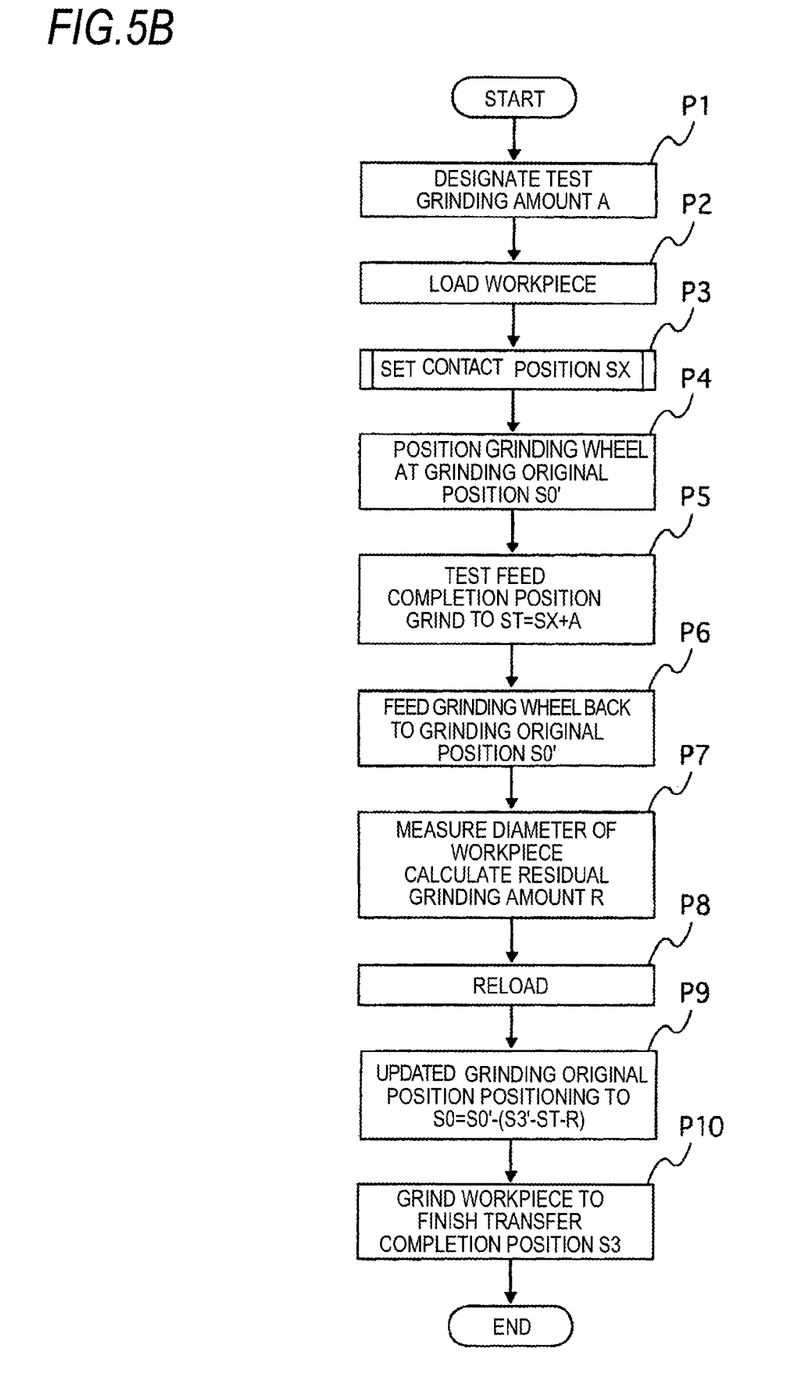
FIG. 5B is a flowchart illustrating a grinding process.

As illustrated in FIGS. 1, 2, 5 and 6, after the test grinding amount A is designated (P1 in FIG. 5B), the workpiece (outer ring) 2 is loaded (P2 in FIG. 5B).

In this instance, the designation of the test grinding amount A is performed by inputting the grinding dimension (inner diameter dimension) from the input instruction section 14 (see FIG. 5B) of the grinding wheel control system NC. The grinding dimension (inner diameter dimension after the test grinding) may be designated as a dimension smaller than a "finish dimension" preset for each "model number". However, since the grinding dimension is determined according to the finish dimension, numerical values are not particularly limited herein. In this embodiment, the dimension is set to be smaller than the finish dimension to perform the grinding on inner surface of the workpiece (outer ring) 2, but a dimension may be set to be larger than the finish dimension if the outer surface of the workpiece is ground.

Subsequently, based on the preset contact (teaching) position SX (P3 in FIG. 5B), the grinding wheel 4 is positioned at the grinding original position S0' as the first product grinding start position back away from the contact position SX (P4 in FIG. 5B). The grinding original position S0' as the first product grinding start position is located back away from the contact position SX, and it means the range in which the grinding wheel 4 is not in contact with the radially inner surface of the workpiece (outer ring) 2, that is, the track groove 2s of the outer face.

In this instance, the contact position SX may be set by performing the teaching operation using the workpiece (outer ring) 2 as a first product to be actually ground, or may be set by calculation without performing the teaching operation.

Figure 6A:
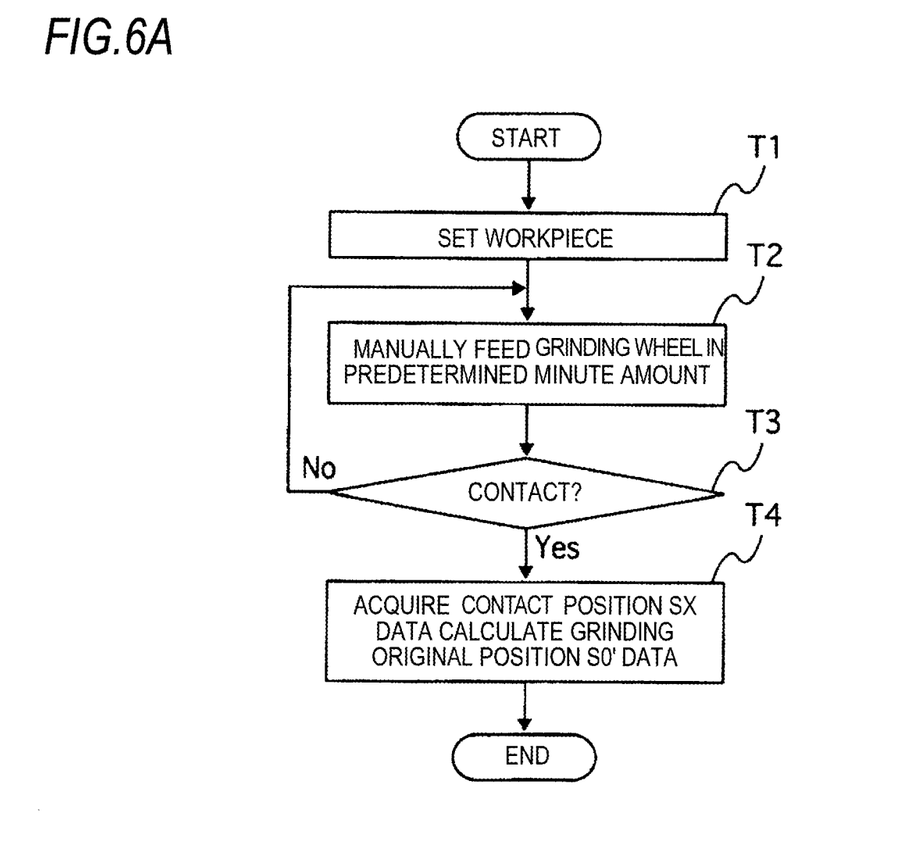
FIG. 6A is a flowchart illustrating a contact position setting process in a case where there is a teaching.
Figure 6B:
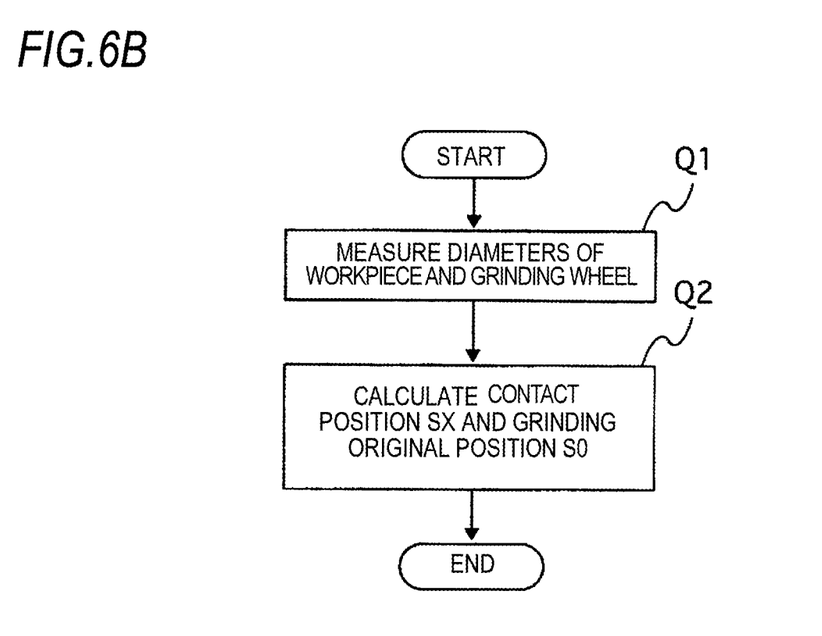
FIG. 6B is a flowchart illustrating a contact position setting process in a case where there is no teaching.

After the first workpiece (outer ring) 2 is set on the grinding machine (T1 in FIG. 6A), the grinding wheel 4 is manually fed by a small amount at a time toward the inner surface (portion corresponding to the track groove of the outer ring) of the workpiece (outer ring) 2 (T2 in FIG. 6A). When the grinding wheel 4 comes into contact with the radially inner surface of the workpiece (outer ring) 2 (T3 in FIG. 6A), the arithmetic processing section 12 can obtain the position of the contact point as data of the contact position SX (T4 in FIG. 6A).

The data of the contact position SX can be managed as a coordinate position, for example, by an AC servo motor. In this instance, the arithmetic processing section 12 (see FIG. 5B) of the grinding wheel control system NC can calculate the grinding original position S0' as the first product grinding start position, based on the data of the contact position SX managed as the coordinate position (T4 in FIG. 6A).

It is possible to perform the setting of the contact position SX by the calculation, without performing the teaching operation described above. In this instance, the diameter WD of the grinding wheel 4 and the (inner diameter) ID of the workpiece (outer ring) 2 prescribed for every model number are respectively stored (Q1 in FIG. 6B), and thus the arithmetic processing section 12 of the grinding wheel control system NC calculates the contact position SX and the grinding original position S0' (Q2 in FIG. 6B).

In this instance, the diameter WD of the grinding wheel 4 and the (inner diameter) ID of the workpiece (outer ring) 2 can be managed as the coordinate position be the AC servo motor, based on the center position SP of the support shaft 6 (see FIG. 3). That is, the arithmetic processing section 12 of the grinding wheel control system NC can calculate the contact position SX based on the difference between the diameter WD of the grinding wheel 4 and the (inner diameter) ID of the workpiece (outer ring) 2, and then calculate the grinding original position S0' as the first product grinding start position, based on the contact position SX calculated.

The center position CP of the support shaft 6 is stored in the arithmetic processing section 12 in advance as information to control the AC servo motor for feed control of the support shaft 6. The center position CP of the support shaft 6 supporting the grinding wheel 4 is a position in which a rotational center line of a backing plate (not illustrated) rotatably supporting the workpiece (outer ring) 2 coincides with a center line of the grinding wheel 4.

An error may occur between the contact position SX and the grinding original position S0' which are calculated by the calculation, and the actual positions. The radially inner surface of the workpiece (outer ring) 2, that is, the track groove 2s of the outer face, may not be able to be ground with high accuracy depending upon the degree of error. Accordingly, so as to prevent the occurrence of such a problem, it is preferable to calculate the contact position SC and the grinding original position S0' in view of the following 6 factors.

(1) In a case in which the workpiece 2 is an outer ring, a positional error of a backing plate (not illustrated) rotatably supporting the workpiece 2.

(2) In a case in which the workpiece 2 is the outer ring, a dimensional error of an outer diameter of an outer ring groove.

(3) Measurement error of the diameter WD of the grinding wheel 4.

(4) Error due to an inclination (bending amount) of a quill type support shaft 6.

(5) In a case in which the workpiece 2 is held by a pair of shoes, an error due to wearing of the shoes.

(6) In a case in which the workpiece 2 is held by a pair of shoes, an error in polishing precision of the shoes.

Herein, the grinding original position S0' is a position retreated back from the contact position SX, and a retreat amount (distance) thereof is preferably set to be smaller than the grinding start position (i.e., updated grinding original position S0) when the finish grinding which will be described later is performed. That is, the grinding original position S0' is preferably set to satisfy the relation of S0'<S0<SX, based on the updated grinding original position S0 and the contact position SX.

In this way, the grinding original position S0' is calculated as the first product grinding start position, based on the contact position SX (P3 in FIG. 5B). The arithmetic processing section 12 positions the grinding wheel 4 at the grinding original position S0' (P4 in FIG. 5B), and moves the grinding wheel 4 to the test feed completion position ST (ST=SX+A). Accordingly, the grinding wheel 4 performs the (test) grinding on the radially inner surface of the workpiece (outer ring) 2, that is, the track groove 2s of the outer face, by the "test grinding amount A" described above (P5 in FIG. 5B).

Figure 2:
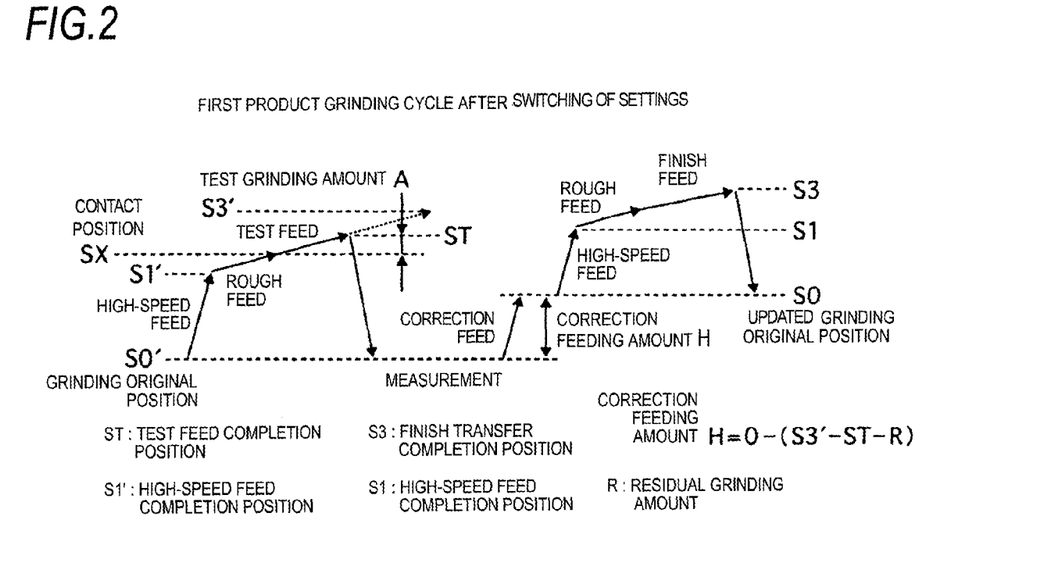
FIG. 2 is a diagram illustrating a detailed configuration of a first product grinding cycle at after the settings have been switched.

Specifically, the arithmetic processing section 12 feeds the grinding wheel 4 from the grinding original position S0' to the high-speed feed completion position S1' at a high speed, and roughly feeds the grinding wheel from the high-speed feed completion position S1' to the contact position SX. After that, the arithmetic processing section 12 test feeds the grinding wheel 4 from the contact position SX to the test feed completion position ST to perform the grinding. Accordingly, the arithmetic processing section 12 performs the (test) grinding on the radially inner surface of the workpiece (outer ring) 2, that is, the track groove 2s of the outer face, by the "test grinding amount A".

When the grinding corresponding to the "test grinding amount A" is completed, the arithmetic processing section 12 feeds the grinding wheel 4 back to the grinding original position S0' (P6 in FIG. 5B), and the workpiece (outer ring) 2 is unloaded. In this instance, the arithmetic processing section 12 measures the radially inner surface of the workpiece (outer ring) 2, that is, the track groove 2s of the outer face. Based on the results of the measurement, the residual amount to be ground (residual grinding amount) R to obtain the finish dimension is calculated (P7 in FIG. 5B).

The calculation of the residual amount (residual grinding amount) R may be automatically performed by the arithmetic processing section 12 of the grinding wheel control system NC, or may be performed manually or by a post-process (measurement of grinding completed portion using a measuring gauge).

Subsequently, the calculated "residual grinding amount R" is input from the input instruction section 14 of the grinding wheel control system NC, thereby starting up (reloading) the grinding cycle (P8 in FIG. 5B). Accordingly, the grinding wheel 4 moves forward (approaches) toward the workpiece 2 by a correction feeding amount H, and is positioned at the updated grinding original position S0 (S0=S0'−(S3'−ST−R)) (P9 in FIG. 5B).

After that, the grinding cycle is followed by a normal grinding routine. The arithmetic processing section 12 moves the grinding wheel 4 positioned at the updated grinding original position S0 to the finish feed completion position S3, and performs the (finish) grinding on the radially inner surface of the workpiece (outer ring) 2, that is, the track groove 2s of the outer face by the "residual grinding amount R" (P10 in FIG. 5B).

Specifically, the grinding wheel 4 is fed at a high speed from the updated grinding original position S0 to the high-speed feed completion position S1, and is roughly fed from the high-speed feed completion position S1. Accordingly, the arithmetic processing section 12 performs the grinding by controlling the grinding wheel 4 such that the grinding wheel 4 comes into contact with the radially inner surface of the workpiece (outer ring) 2, that is, the track groove 2s of the outer face, and then is finish-fed to the finish feed completion position S3 from this state. In this way, the arithmetic processing section 12 performs the (finish) grinding on the radially inner surface of the workpiece (outer ring) 2, that is, the track groove 2s of the outer face, by the "residual grinding amount R". The "first product grinding cycle after switching of settings" is completed by feeding the grinding wheel 4 back to the updated grinding original position S0.

After the first product grinding cycle is completed in this way for the first (first product) workpiece (outer ring) 2 after switching of settings, there is a case where the grinding is performed on a workpiece 2 (second and subsequent workpieces 2) having the same "model number" as that of the first workpiece (outer ring) 2. In this instance, in the grinding on each workpiece 2, the updated grinding original position S0 becomes the "grinding original position S0" as the "normal grinding start position" for the second and subsequent ones. The arithmetic processing section 12 repeats the "normal grinding cycle" which feeds the grinding wheel from the grinding original position S0' through the high-speed feed completion position S1 and the finish feed completion position S3 and back to the grinding original position S0'.

As described above, according to this embodiment, the radially inner surface of the workpiece (outer ring) 2, that is, the track groove 2s of the outer face, is ground to have a dimension smaller than the finish dimension, and then the inner diameter of the grinding completed product. Subsequently, based on the results of the measurement, the residual amount to be ground (residual grinding amount) to obtain the finish dimension is calculated, and the grinding is performed by this "residual grinding amount". Therefore, high skill for the teaching operation (contacting operation) is not necessary, and the radially inner surface of the workpiece (outer ring) 2, that is, the track groove 2s of the outer face, can be finished to have the target dimension, even though the teaching operation is performed relatively rough (i.e., in the case where a difference from the actual contact position SX is large to some extent). In the case where the contact position SX or the like is assumed by the calculation without performing the teaching operation, various errors are generally included. However, according to this embodiment, the same effect can be obtained in such a case.

Therefore, the shortening of the time required for the switching of the workpiece settings can be improved. In addition, even in the case where the in-process gauge is not used, it is possible to decrease the production of a defective product and to unload a good product having a target dimension from the first grinding. As a result, the efficiency of the grinding on the workpiece can be remarkably improved.

The present invention is not limited to the embodiment described above, and various changes may be made to implement the invention without being departing from the scope defined by the appended claims. For example, when the machine starts up (e.g., starting up every morning or at the beginning of the week, or starting up after the machine has been stopped for a long time), dimensions of a machine configuration may be varied due to a temperature difference (e.g., atmospheric temperature or water temperature). Accordingly, for example, the positional relationship between the grinding wheel 4 and the radially inner surface of the workpiece (outer ring) 2, that is, the track groove 2s of the outer ring, is varied, but it is possible to realize the first product grinding cycle at the start-up which is not influenced by the variation.

Figure 4:
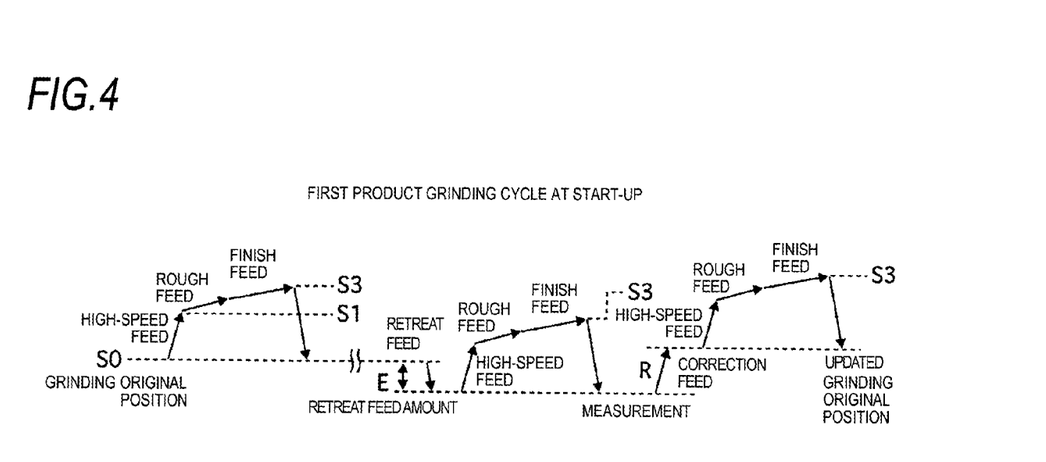
FIG. 4 is a diagram illustrating a detailed configuration of a first product grinding cycle at start-up.

In this instance, in the operational flow based on the detailed configuration to implement the "first product grinding cycle at start-up", an additional process is required for the flowchart illustrated in FIG. 5B. That is, it is necessary to perform a process of positioning the grinding wheel 4 at a position (position spaced apart from the workpiece (outer ring) 2) retreated from the normal grinding start position (grinding original position S0) by a predetermined "retreat amount" in the grinding performed at the last time (just before) (see FIG. 4).

The "retreat amount" is set depending on the variation in dimension of the machine configuration due to the temperature difference (e.g., atmospheric temperature or water temperature). For this reason, the "retreat amount" is not particularly limited to a numerical value herein. Since the process after the set "retreat amount" is input from the input instruction section 14 (see FIG. 5B) of the grinding wheel control system NC is followed by the same process as the "first product grinding cycle after switching of settings", its description will be omitted.

According to this modification, when the grinding machine starts up, even when the dimensions of the machine configuration are varied due to the temperature difference (e.g., atmospheric temperature or water temperature), it is possible to finish the radially inner surface of the workpiece (outer ring) 2, that is, the track groove 2s of the outer ring, having the target dimension. Therefore, it is possible to shorten the time required for the start-up, and to decrease the production of the defective product, even in the case where the in-process gauge is not used, thereby grinding the good product having the target dimension from the first grinding. As a result, the efficiency of the grinding on the workpiece can be remarkably improved.

The present application is based on Japanese Patent Application No. 2011-153217 filed on Jul. 11, 2011, the entire content of which is incorporated herein by reference.

EXPLANATION OF REFERENCE SIGNS 2 workpiece
A: test grinding amount
SX: contact position
R: residual amount to be ground (residual grinding amount)

The invention claimed is:

1. A grinding machine comprising a grinding wheel configured to grind a workpiece, and a grinding wheel control system configured to move the grinding wheel relative to the workpiece to grind the workpiece to have a predetermined finish dimension, the grinding machine comprising:
a first control section configured to preset a contact position at which the grinding wheel contacts a first workpiece;
a second control section configured to position, based on the contact position that has been preset, the grinding wheel at a first product grinding start position located back away from the contact position;
a third control section configured to move the grinding wheel from the first product grinding start position to grind the first workpiece by a predetermined amount from the contact position so as to obtain a dimension larger than a finish dimension if an outer surface of the workpiece is ground or to obtain a dimension smaller than the finish dimension if an inner surface of the workpiece is ground, and thereafter to feed the grinding wheel back to the first product grinding start position;
a fourth control section configured to measure a diameter of the first workpiece that has been ground, and to calculate a residual amount to be ground to obtain the finish dimension, based on a result of the measurement; and
a fifth control section configured to position the grinding wheel at a position shifted toward the workpiece by a correction amount, the position being a normal grinding start position in grinding a second and subsequent workpieces, and to move the grinding wheel from the normal grinding start position to grind the workpiece to a finish feed completion position.

2. The grinding machine according to claim 1, wherein the first control section is configured to set the contact position by performing a teaching operation using the first workpiece.

3. The grinding machine according to claim 1, wherein the first control section is configured to set the contact position based on a difference between a diameter of the grinding wheel and the diameter of the first workpiece.

4. The grinding machine according to claim 1, further comprising a sixth control section configured to position, when starting up the grinding machine, the grinding wheel at a position retreated by a predetermined retreat amount from the normal grinding start position if a dimension of a configuration of the grinding machine has been changed.

5. A grinding method using a grinding machine including a grinding wheel configured to grind a workpiece, and a grinding wheel control system configured to move the grinding wheel relative to the workpiece to grind the workpiece to have a predetermined finish dimension, the grinding method comprising:
a first step of presetting a contact position at which the grinding wheel contacts a first workpiece;
a second step of positioning, based on the contact position that has been preset, the grinding wheel at a first product grinding start position located back away from the contact position;
a third step of moving the grinding wheel from the first product grinding start position to grind the first workpiece by a predetermined amount from the contact position so as to obtain a dimension larger than a finish dimension if an outer surface of the workpiece is ground, or to obtain a dimension smaller than the finish dimension if an inner surface of the workpiece is ground, and thereafter feeding the grinding wheel back to the first product grinding start position;
a fourth step of measuring a diameter of the first workpiece that has been ground, and calculating a residual amount to be ground to obtain the finish dimension, based on a result of the measurement; and
a fifth step of positioning the grinding wheel at a position shifted toward the workpiece by a correction amount, the position being a normal grinding start position in grinding second and subsequent workpieces, and moving the grinding wheel from the normal grinding start position to grind the workpiece to a finish feed completion position.

6. The grinding method according to claim 5, wherein, in the first step, the contact position is set by performing a teaching operation using the first workpiece.

7. The grinding method according to claim 5, wherein, in the first step, the contact position is calculated based on a difference between a diameter of the grinding wheel and the diameter of the first workpiece.

8. The grinding method according to claim 5, further comprising a sixth step of positioning, when starting up the grinding machine, the grinding wheel at a position retreated by a predetermined retreat amount from the normal grinding start position if a dimension of a configuration of the grinding machine has been changed.

* * * * *